Patented Oct. 26, 1954

2,692,887

UNITED STATES PATENT OFFICE 2,692,887

ORGANO-SILICON PEROXY COMPOUNDS AND THEIR PREPARATION

Kenneth L. Berry, Hockessin, Del., assignor to E. I. du Pont de Nemours and Company, Wilmington, Del., a corporation of Delaware No Drawing. Application February 4, 1952, Serial No. 269,900

16 Claims. (Cl. 260—448.2)

This invention relates to new organosilicon compounds and more particularly to new organosilicon peroxy compounds and to methods for their production.

Organic peroxygen compounds are an important class of compounds and have found utility as oxidizing agents and as polymerization catalysts. No organic silicon peroxides, e. g., those having the linkage

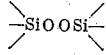

have been reported. These should constitute a new and valuable class of peroxidic compounds with particular utility in polymerization initiation or other reaction stemming from the silicon peroxide linkage.

It is an object of this invention to provide new organosilicon peroxy compounds and methods for their preparation. A further object is to provide new organosilicon peroxy compounds which are effective at low temperatures for polymerization initiation and other reactions. Other objects will appear hereinafter.

These objects are accomplished by the following invention of organosilicon compounds which are characterized by having attached to one of the valences of silicon, a peroxy, —O—O—, group. These organosilicon peroxides contain the peroxy group, —O—O—, have from one to two silicon atoms bonded to the peroxy group and have organic radicals containing a total of at least three carbon atoms attached to each silicon atom and in a preferred embodiment have three monovalent hydrocarbon radicals attached to each silicon atom.

The compounds of this invention are prepared by reaction of an alkali metal organic monosilanolate with halogen of atomic number 17 to 35, i. e., chlorine or bromine. An alternate and less preferred method involves the reaction of a trisubstituted monochlorosilane or a trisubstituted silanol with concentrated hydrogen peroxide in a homogeneous system. Particularly preferred is the reaction of a sodium trihydrocarbon silanolate with chlorine to give a hydrocarbonsilicon peroxide R₃SiOOSiR₃, wherein the R's are hydrocarbon radicals.

The following examples, in which the parts are by weight unless otherwise stated, further illustrate the practice of this invention.

Example I

Twenty-five parts of triphenylsilanol was dissolved in approximately 350 parts of dry xylene, three parts of sodium was placed in this solution and the mixture was refluxed for 8 hours under a nitrogen atmosphere. The hot solution was filtered and allowed to cool, whereupon crystals separated. The crystalline product was isolated by filtration and dried in an atmosphere of dry nitrogen. There was obtained 20.8 parts of the crystalline product which had a neutral equivalent of 302. The calculated neutral equivalent of sodium triphenylsilanolate is 298.

One and ninety-seven hundredths parts of sodium triphenylsilanolate was dissolved in about 70 parts at 0° C. of a 4:1 mixture of purified carbon tetrachloride/chloroform and kept under a nitrogen atmosphere. This solution was maintained at 0° C. and agitated by passing a stream of dry nitrogen through it. Dry chlorine was mixed with the nitrogen and passed into the solution of sodium triphenylsilanolate until the solution was neutral when a drop was placed on wet acid-base indicator paper. A precipitate of sodium chloride appeared in the solution immediately upon addition of chlorine. The solution containing suspended sodium chloride was strongly peroxidic. The reaction product was analyzed for sodium chloride and found to contain 0.36 part. The yield of sodium chloride calculated according to the equation

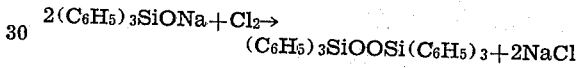

is 0.38 part.

Thirty minutes after completion of the chlorine addition, which required 20 minutes, the reaction product was analyzed for peroxidic oxygen by iodimetric assay and the active oxygen value indicated a 99.5% yield of di(triphenylsilyl) peroxide. Analyses for peroxidic oxygen were made at intervals for 48 hours, and it was found that the peroxide underwent decomposition. After 24 hours one-half of the original amount remained, and after 48 hours 28.2% remained. The decomposition of the peroxide was kinetically first order at least during the early stages of the decomposition.

Example II

The process of Example I was repeated except that the reaction was conducted employing 5 parts of sodium triphenylsilanolate in pure chloroform solution at −40 to −50° C. The solvent was removed from the strongly peroxidic product by vacuum distillation at temperatures below 0° C. A solid peroxide product remained which retained traces of the solvent. The product was heated for about one-half hour to 60° C. under high vacuum. A colorless, slightly pasty solid was obtained. After storage 6 days at room temperature this peroxide product was analyzed iodimetrically for peroxide oxygen. It contained 0.15% active oxygen which indicated that 6.3% of the original di(triphenylsilyl)peroxide remained in the solid product after the storage period. In two more days at atmospheric conditions 1.2% of the original peroxide remained.

*Example III*

One part of sodium triethylsilanolate in solution in about 10 parts of chloroform was treated with chlorine. There was an immediate precipitate of sodium chloride and the reaction product was strongly peroxidic as a a result of the formation of di(triethylsilyl)peroxide.

*Example IV*

Five parts of triphenylchlorosilane was dissolved in 52.5 parts of nitroethane by warming to about 50° C. and the solution filtered. A total of 1.4 parts of 90% hydrogen peroxide was added to this solution with all but about 0.1 part of it dissolving. After standing overnight at room temperature, the mixture was warmed for one hour at 40° C. and then evaporated in vacuo to dryness. The residue comprised an amber, sticky, crystalline mass soluble in benzene. The benzene solution was washed six times with distilled water. The peroxide content of the water washings were high initially and gradually disappeared in successive washings.

The benzene solution, which was peroxidic, was dried with sodium sulfate and then evaporated under a nitrogen stream to a small volume at which point it comprised a mixture of colorless crystals in an amber syrup. The crystals (M. P. 151° C.) were removed by filtration, washed with benzene, and dried. They were non-peroxidic and were triphenylsilanol. Peroxide content of the product was determined by permanganate titration of a solution of the sample in benzene mixed with water containing sulfuric acid. The peroxide content as hydrogen peroxide equivalent was 1.21%. This indicates that the product contained 19.6% of di-(triphenylsilyl)peroxide, $(C_6H_5)_3SiOOSi(C_6H_5)_3$.

*Example V*

Seven parts of triphenylsilanol was dissolved in 39 parts of acetonitrile. Five and six-tenths parts of 90% hydrogen peroxide was added to this solution which was then heated 48 hours at 65–70° C. The reaction mixture was evaporated under a stream of nitrogen to about half of its original volume whereupon crystallization started. The entire mixture was poured into about 100 parts of water. The solid precipitate was removed by filtration, washed thoroughly with water, and dried. It was dissolved in benzene and crystallized therefrom. Three parts of triphenylsilanol was recovered in three crystal crops.

The peroxide content indicated that the product contained di(triphenylsilyl)peroxide, $(C_6H_5)_3SiOOSi(C_6H_5)_3$, in addition to some triphenylsilylhydroperoxide, $(C_6H_5)_3SiOOH$.

A portion (0.248 part) of the above mixture was dissolved in 7 parts of styrene. Polymerization took place and the polymer contained 0.06% silicon.

Included within this invention are organosilicon compounds which have a peroxy group attached to silicon and the remaining valences of the silicon bonded to monovalent organic radicals containing a total of at least three carbon atoms. Particularly useful are organic silicon compounds in which each of the organic radicals is a hydrocarbon radical of up to seven carbons, particularly a hydrocarbon radical free of aliphatic unsaturation, e. g., methyl, ethyl, phenyl, or tolyl. Also useful are silicon esters of hydroxy compounds, e. g., alkoxy, such as those having ethoxyl groups attached to silicon. The most useful products of this invention have the general formula, $$(R_3SiO)_n(OX)_{2-n}$$

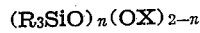

wherein R is hydrogen, hydrocarbon, particularly an aryl hydrocarbon radical, alkyl or an alkoxy radical, especially of up to 7 carbon atoms, $n$ is an integer of from 1 to 2, and X is hydrogen or a monovalent inorganic ion, e. g., an alkali metal ion including sodium and potassium, the total carbon content on each silicon being at least three carbon atoms. Thus in the above general formula, when $n=1$, the peroxide has the formula $R_3SiOOX$, with X hydrogen as in a triarylsilylhydroperoxide, e. g., triphenylsilylhydroperoxide or its salt forming metal derivatives. When $n=2$ the compounds are the peroxides, $(R_3SiO)_2$, i. e., $R_3SiOOSiR_3$ as in a di(triarylsilyl)peroxide.

Representative silicon peroxides of this invention include sodium triphenylsilylhydroperoxide, triethylsilylhydroperoxide, di(triethylsilyl)peroxide, di(diphenylethylsilyl)peroxide, diphenylethylsilylhydroperoxide, and dimethylethylsilylhydroperoxide.

New organic silicon peroxy compounds included within this invention are preferably obtained by the reaction of a halogen of atomic number 17 to 35, i. e., chlorine or bromine, with an alkali metal silanolate in which the silicon has attached thereto inert organic groups containing a total of at least three carbon atoms, such as hydrocarbon or alkoxy radicals. In general, the alkali metal is lithium, sodium or potassium and the hydrocarbon radicals contain 1–7 carbons. Examples of such compounds include the sodium and potassium salts of trimethyl silanol, triethyl silanol, triethoxyl silanol, tri-p-chloro-phenyl silanol, and tri-p-nitrophenyl silanol.

In the process of this reaction it is essential that the system be anhydrous to preclude hydrolysis of the alkali forming metal silanolate. The reaction with halogen is generally conducted at a relatively low temperature, e. g., −70 to 30° C.

In general any inert diluent or solvent may be employed for the formation of the alkali-metal silanolate and the reaction with halogen. Suitable diluents that are useful in this reaction are hydrocarbons, halogenated hydrocarbons and ethers.

The new organosilicon peroxy compounds of this invention also are obtained by reaction with concentrated hydrogen peroxide of an organosilicon monomeric compound which contains only one hydroxyl or chlorine attached to silicon, with the remaining three valences of each silicon bonded to inert organic groups, e. g., hydrocarbon, preferably of not more than 7 carbon atoms, including alkyl and aryl radicals and alkoxy groups of generally 1–7 carbons. Examples of such compounds include tribenzylchlorosilane, triethylchlorosilane, tri-p-tolylchlorosilane, ethyldimethylchlorosilane, diphenylethylchlorosilane, triethylsilanol, tribenzylsilanol, triethoxylsilanol, diphenylethoxysilanol, and triethoxychlorosilane. These silicon compounds are preferably free from ethylenic unsaturation to avoid attack of this linkage by hydrogen peroxide and have the general formula $R_3SiY$, where R is an organic radical containing at least one carbon atom, such as hydrocarbon or alkoxy and Y is hydroxyl or chlorine. Triarylchlorosilanes and triarylsilanols are preferred.

In general, any inert solvent which is a solvent for both the silicon compound and hydrogen peroxide, such as the nitroparaffins or liquid nitriles, is employed as solvent to produce a homogeneous system for the reaction with hydrogen peroxide. The hydrogen peroxide employed is of high concentration, e. g., of at least 75% and preferably 90% concentration. It is usually employed in an excess (on a molar basis) of the silicon compound. The reaction is conducted at temperatures usually below 70° C. or, in general, at temperatures where hydrogen peroxide remains stable for long periods.

The organosilicon peroxides are useful in the initiation of polymerization of ethylenically unsaturated compounds, particularly at low temperatures.

As many apparently widely different embodiments of this invention may be made without departing from the spirit and scope thereof, it is to be understood that this invention is not limited to the specific embodiments thereof except as defined in the appended claims.

I claim:
1. Triphenylsilylhydroperoxide.
2. Di(triphenylsilyl) peroxide.
3. Di(triethylsilyl) peroxide.
4. A method for preparing di(triphenylsilyl)-peroxide which comprises reacting under anhydrous conditions sodium triphenylsilanolate with chlorine and separating therefrom di(triphenylsilyl) peroxide.
5. A method for preparing di(triethylsilyl)-peroxide which comprises reacting under anhydrous conditions sodium triethylsilanolate with chlorine and separating therefrom di(triethylsilyl) peroxide.
6. A method for preparing at least one of the compounds di(triphenylsilyl) peroxide and triphenylsilylhydroperoxide which comprises reacting hydrogen peroxide of at least 75% concentration with triphenylsilanol in a homogeneous system of a solvent for both of said reactants, and separating therefrom at least one of said compounds di(triphenylsilyl) peroxide and triphenylsilylhydroperoxide.
7. A method for preparing organosilicon peroxy compounds which comprises reacting under anhydrous conditions a halogen of atomic number 17 to 35 with an alkali metal silanolate in which the silicon has attached thereto organic radicals containing a total of at least three carbon atoms and selected from the class consisting of aryl radicals, monovalent aliphatic saturated hydrocarbon radicals and alkoxy radicals of up to seven carbon atoms, and separating therefrom an organosilicon peroxy compound.
8. A method for preparing di(triarylsilyl) peroxides which comprises reacting under anhydrous conditions a halogen of atomic number 17 to 35 with an alkali metal triarylsilanolate and separating therefrom a di(triarylsilyl) peroxide.
9. A method for preparing di(trialkylsilyl)-peroxides which comprises reacting under anhydrous conditions a halogen of atomic number 17 to 35 with an alkali metal trialkylsilanolate, and separating therefrom a di(trialkylsilyl) peroxide.
10. An organosilicon peroxy compound having from one to two silicon atoms bonded to a peroxy group and selected from the class consisting of triphenylsilylhydroperoxide and peroxy compounds having the general formula $R_3SiOOSiR_3$ wherein R is selected from the class consisting of aryl, alkyl and alkoxy radicals of up to seven carbon atoms.
11. A di(triarylsilyl) peroxide having two silicon atoms bonded to a peroxy group and having the formula $R_3SiOOSiR_3$ wherein R is an aryl radical of up to seven carbon atoms.
12. A di(trialkylsilyl) peroxide having two silicon atoms bonded to a peroxy group and having the general formula $R_3SiOOSiR_3$ wherein R is an alkyl radical of up to seven carbon atoms.
13. A method for preparing a di(triarylsilyl)-peroxide which comprises reacting hydrogen peroxide of at least 75% concentration with a member selected from the class consisting of triarylchlorosilanes and triarylsilanols, the reaction being carried out in a homogeneous system of a solvent for both of said reactants, and separating therefrom a di(triarylsilyl) peroxide having the formula $R_3SiOOSiR_3$ wherein R is an aryl radical.
14. A method for preparing a di(triarylsilyl)-peroxide which comprises reacting hydrogen peroxide of at least 75% concentration with a triarylchlorosilane in a homogeneous system of a solvent for both of said reactants, and separating therefrom a di(triarylsilyl) peroxide having the formula $R_3SiOOSiR_3$ wherein R is an aryl radical.
15. A method for preparing di(triphenylsilyl)-peroxide which comprises reacting hydrogen peroxide of at least 75% concentration with triphenylchlorosilane in a homogeneous system of a solvent for both of said reactants, and separating therefrom di(triphenylsilyl) peroxide.
16. A method for preparing a di(triarylsilyl)-peroxide which comprises reacting hydrogen peroxide of at least 75% concentration with a triarylsilanol in a homogeneous system of a solvent for both of said reactants, and separating therefrom a di(triarylsilyl) peroxide having the formula $R_3SiOOSiR_3$ wherein R is an aryl radical.

No references cited.